F. W. WHITE.
Seed Planter.
No. 21,393.
Patented Aug. 31, 1858.
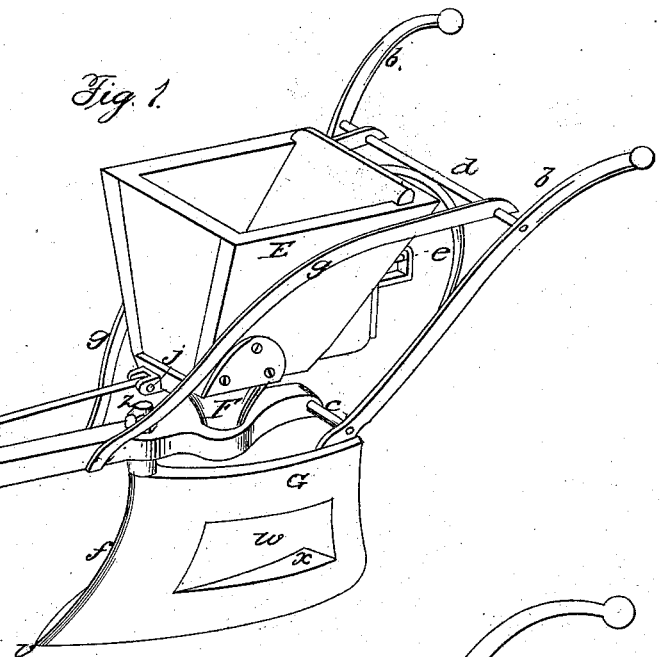
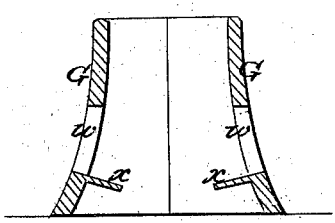
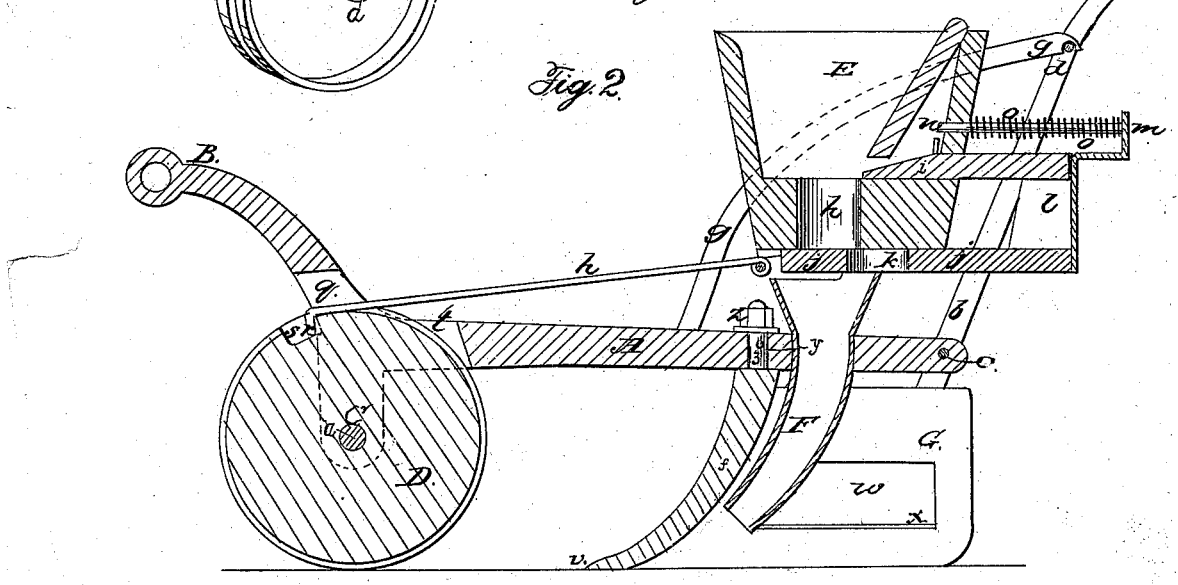

UNITED STATES PATENT OFFICE.

FRANKLIN W. WHITE, OF WORCESTER, MASSACHUSETTS.

IMPROVEMENT IN CORN-PLANTERS.

Specification forming part of Letters Patent No. 21,393, dated August 31, 1858.

*To all whom it may concern:*

Be it known that I, FRANKLIN W. WHITE, of Worcester, in the county of Worcester and State of Massachusetts, have invented a certain new and useful Improvement in Machines for Dropping and Covering Corn, Potatoes, &c.; and I do hereby declare that the following is a full, clear, and exact description of the construction and operation of the same, reference being had to the accompanying drawings, making a part of this specification, in which—

Figure 1 represents a perspective view; Fig. 2, a longitudinal vertical section, and Fig. 3 a transverse section through the mold-boards.

Similar letters of reference, where they occur in the several figures, denote like parts of the apparatus in all of them.

My invention relates to the devices for dropping the corn or potatoes in the furrow opened by the machine, and, in connection therewith, the manner of covering the grains, seed, or other thing dropped in said furrow.

To enable others skilled in the art to make and use my invention, I will proceed to describe the same with reference to the drawings.

A represents the beam of the planting and covering plow, having an arm, B, at its extreme front end, to which the team is hitched, and lugs C, projecting downward for furnishing bearings for the journals a of the supporting-wheel D, which also actuates the seed-slide or cut-off.

At the rear of the beam A are placed the handles b b, their lower ends secured to the mold-boards and braced to the beam by the rung c, and to each other by the straight rung d and curved one e.

In advance of the handles b b is placed the seed-hopper E, from the bottom of which extends a seed tube or spout, F, curving slightly forward at its lower end to bring its terminus close under and behind the share part f of the plow, the hopper being partly supported on the beam by the seed-tube and partly by the braces g g, which are fastened to it and to the beam and rung d.

Through the bottom of the hopper E there is an opening, h, for the seed or other thing to drop through when the slides or cut-offs are actuated.

i is an upper, and j a lower, slide or cut-off, the upper one sliding over the opening h at top, while the lower one brings its opening k in line with the opening h for the purpose of holding back the seed, &c., in the hopper, while that between the slides drops down through the tube F into the furrow previously opened for it. The slide i works through a mortise in the hopper, and the other one, j, works in ways or guides underneath the hopper, both slides at their rear ends being connected to a head-block, l, on which there is a projection, m, that carries a rod, n, around which a spiral spring, o, is coiled, one end of which presses against said projection and the other end against the hopper.

To the front end of the slide j is connected a rod, p, which extends forward over the top of the beam and through a slot, q, made through the heel of the arm B, where it has its end bent down to a right angle, or nearly so, and so that said arm r may drop into a recess or hole, s, made in the tread of the wheel D every time said hole (or holes, if more than one be used) comes around. When the arm r has dropped into said hole s the rotation of the wheel carries and draws forward with it said rod p, as also the slides or cut-offs i j attached to it, until they are in the proper position for the charge of seed held in h to drop through into the furrow. By this time the perimeter of the wheel in rear of the hole s comes against said rod p and raises its arm r out of said hole, and the uncoiling of the spring o draws back the slides into the position shown in Fig. 2, and the hole h receives another charge for the next dropping operation. An opening, t, is made through the front of the beam to allow the rod p and wheel D to meet each other, and an opening, u, may be made through the web of the wheel at the base of the hole s, so that it may be cleaned out should any dirt or obstruction get into it.

G G are double mold-boards, meeting at an edge at f, and having a point at v. This point, edge, and mold-boards open out a furrow for the seed to be dropped into, which is effected as above described. In the mold-boards or wings G there are openings w w, through which the mellow pulverized soil passes into the space between said mold-boards, which space is immediately over the furrow into which the seed has been dropped. The lower edges of these openings w have ledges x x attached to them, which incline as they approach each other. The earth entering through w w is by these ledges directed or guided so as to fall immediately over the dropped seed, and they are thus covered by the finest and mellowest of the soil, while all stone, sods, &c., are thrown off by the wings. The mold-boards are secured to the beam by a shank, $y$, and nut $z$, and otherwise braced by the handles, rungs, &c.

Having thus fully described the nature and object of my invention, what I claim is—

1. Operating the seed-slides through the rod $p$ and its arm $r$, and the hole (or holes) $s$ in the wheel D, substantially as described.

2. In combination with a dropping apparatus and the double mold-boards for opening the furrow, the openings $w$ and guides $x$, for admitting and directing the earth or soil that is to cover the seed, substantially as described.

FRANKLIN W. WHITE.

Witnesses:
 CHARLES HERSEY,
 ALBERT W. CURTIS.